United States Patent [19]

White

[11] Patent Number: 5,014,219

[45] Date of Patent: May 7, 1991

[54] MASK CONTROLLED NEURAL NETWORKS

[76] Inventor: James A. White, 1757 20th Ave., New Brighton, Minn. 55112

[21] Appl. No.: 191,308

[22] Filed: May 6, 1988

[51] Int. Cl.⁵ .............................................. G06K 9/00
[52] U.S. Cl. ..................... 364/513; 382/16; 364/200; 364/276.6
[58] Field of Search ............ 364/513, 200, 900; 382/14, 15, 16

[56] References Cited

U.S. PATENT DOCUMENTS 4,641,351  2/1987  Preston, Jr. ............................ 382/6
4,803,736  2/1989  Grossberg et al. .................... 382/22

OTHER PUBLICATIONS

M. A. Cohen & S. Grossberg, "Masking Fields: A Massively, Parallel Neural Architecture for Learning, Recognizing, and Predicting Multiple Groupings of Pattern Data," Appl. Opt., vol. 26, No. 10, pp. 1866–1891 (May 15, 1987).

G. Macukow & H. H. Arsenault, "Optical Associative Memory Model Based on Neural Networks having Variable Interconnection Weights," Appl. Opt., vol. 26, No. 5, pp. 924–928 (Mar. 1, 1987).

A. Kuh & B. W. Dickinson, "Informnation Capacity of Modified Associative Memory Models," 1986 IEEE International Symposium on Information Theory, Ann Arbor, MI (Oct. 6–10, 1986).

G. E. Hinton, "Learning in Massively Parallel Nets," Proceedings AAAI-86: Fifth National Conference on Artificial Intelligence, Univ. of Penn., Philadelphia, Pa. (Aug. 11–15, 1986).

L. Bobrowski & E. R. Caianiello, "Comparison of Two Unsupervised Learning Algorithms," Biol. Cybern. (Germany), vol. 37, No. 1, pp. 1–7 (1980).

*Primary Examiner*—Allen MacDonald
*Attorney, Agent, or Firm*—John G. Shudy, Jr.

[57] ABSTRACT

A mask neutral network for processing that allows an external source of control to continuously direct state transition of the neural network toward selected states and away from other states. The network, through externally controlled masking, can focus attention on selected attributes of observed data, solutions or results. The masking is appliciable across three major categories of networks in that it facilitates augmented recall, directed learning and constrained optimization.

12 Claims, 11 Drawing Sheets

TYPICAL NEURAL NETWORK CIRCUIT IN PRIOR ART

TYPICAL NEURAL NETWORK CIRCUIT WITH INVENTION APPLIED

SIGMOID TRANSFER FUNCTION

TRANSFER FUNCTIONS OF DUAL CODED NEURONS

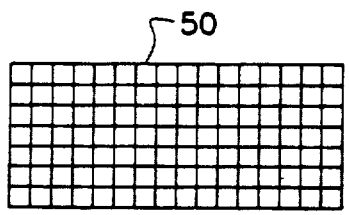
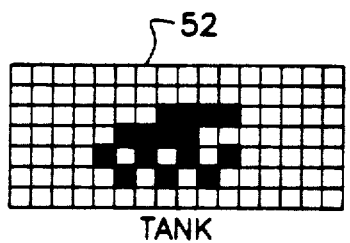
TANK
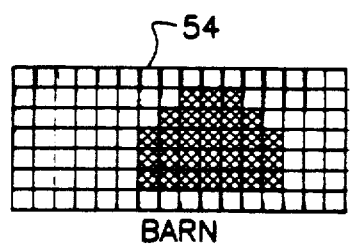
BARN
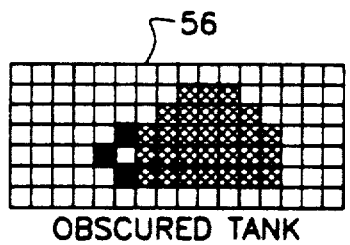
OBSCURED TANK
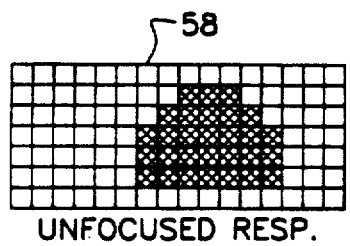
UNFOCUSED RESP.
*Fig. 11*
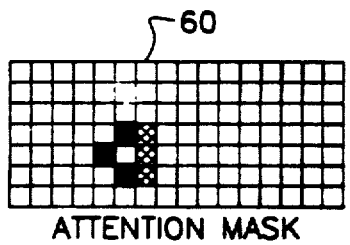
ATTENTION MASK
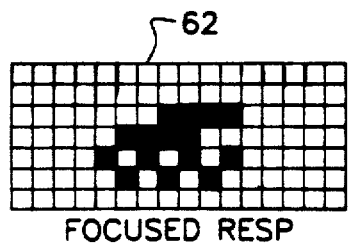
FOCUSED RESP

Fig. 13

```
 File  Edit  Project  Run  Debug  Window
═════════════════════ Text ═════════════════════

This program is the first demonstation
of the feasibility of the Relaxation Algorithm It was first functional on April 20, 1987.
Written by James A. White using Lightspeed Pascal for the Macintosh.
See the associated Map Coordinate Search Example Diagram.

First load the the target coordinates into the neural net.
Target 2:   0010010100100000
Target 3:   0001111000001011110

Now try a conventional Hopfield neural net associative memory search.
    Query:  0001111000000111100
Match Found.
 Response:  0001111000010101110
That's near by Hamming difference, but not by map distance.

Now try it with a mask that communicates what NEAR means.
    Mask:   100**100**
Match found.
 Response:  0010010100010000000

It works!
```

MASK CONTROLED NEURAL NETWORKS

BACKGROUND OF THE INVENTION

The present invention pertains to neural networks. In particular, the invention pertains to neural networks in complex data processing requiring associative recall, supervised learning, or optimization. More particularly the invention pertains to directing such processing operations through masking by imposing weighting on individual neurons, that is, affecting their thresholds.

A neural network consists of very simple processing elements (neurons). FIG. 1a shows a biological neuron 10. The basic electronic neuron and circuitry 20 is illustrated in FIG. 1b. The neurons are commonly interconnected in a network topology 30, as shown in FIG. 2, so that each neuron receives inputs from (many) other neurons. The points of interconnection (synapses) 12 are individually weighted. The weights and procedures used to adjust the weights determine the operation of the network 30. Each neuron 14 consists of a summing function and a threshold function. The summation function adds the values present on the neuron's inputs. The threshold function is usually a sigmoid transfer function (ramped step) 16, as shown in FIG. 3 so that when the summation function output exceeds the threshold, the neuron "fires" and its output switches from an off state to an on state. The potential power of neural networks lies in the parallel operation of a large number of neurons which operate collectively to solve an otherwise intractable problem.

Most neural networks are simulated in software rather than actually implemented. Since this simulation occurs on conventional computers, it can be quite inefficient. Emulation engines are available for several computer systems. These engines are usually conventional processors which have architectures tuned to the specific computations which must be performed during the simulation of neural networks. Notable exceptions are recently developed integrated circuits implemented at Bell Laboratories, California Institute of Technology, and the Jet Propulsion Laboratory.

Typical applications fall into three categories: recall, learning, and optimization. Networks in the recall category perform a mapping from one set of values to another (or the same) set of values. One example is an associative memory network popularized by J. J. Hopfield. These networks associate an initial neural state with a final neural state. The synaptic weight values define the associative mappings Hopfield showed that the operation of the network can be described by an energy function similar to gravity or an electromagnetic field, but in an N-dimensional space where N is the number of neurons. In Hopfield's network there is one field of neurons, the synaptic weights are symmetrical, and the neurons are updated asynchronously. A similar network, the Bi-dimensional Associative Memory (BAM), by B. Kosko, uses two interconnected fields on neurons, one for input and another for output. This configuration allows asymmetrical synaptic weights and parallel neural updating.

Learning networks perform a similar mapping function, but the weight values are initially small random values. A learning algorithm is used to adaptively adjust the weights as training stimuli ar applied. The algorithm compares the network's output with the desired response and determines the appropriate synaptic weight adjustment. An example of this type of network is the Boltzmann Machine. It contains three layered fields of neurons: input, hidden, and output. The synaptic connections are directed from input, through the hidden layer, to the output. No feedback connections are normally present in the Boltzmann Machine, through there have been studies of more general learning networks with feedback One popular learning algorithm, called Back Propagation, proceeds from errors at the output and iteratively adjust weights in the direction of the input. This results in the neurons in the hidden layer becoming sensitized to "features" of the problem as evidenced in the training stimuli.

Optimization networks usually have specialized topologies and weight relationships that represent the constraints of a particular problem. The network is started with its neurons in random states and allowed to operate until it settles on a final state that indicates an optimal solution to the problem. Hopfield describes a network which solved the travelling salesman problem (route planning) effectively. It did not necessarily find the optimal solution, but normally found "good" solutions very rapidly.

Control of a neural network is normally applied by its design or by a set of synaptic weight values. Once the net operation is started it proceeds to its conclusion with little external intervention. In simulation, initial data values are merely applied programmatically to variables representing the neuron outputs. This effectively sets the neurons to desired states. In physical systems, additional neural inputs are provided. Values are held on these inputs until the network stabilizes. The inputs are then removed and the net undergoes state transitions as determined by the neural states and the synaptic weights.

SUMMARY OF THE INVENTION

The present neural network invention is not directed toward modelling the brain or any other physiological phenomenon. Biological systems are used as a guide rather than an objective. The invention exploits the strengths of this computing paradigm as a means of realizing large scale, finegrained parallel processing.

The present invention incorporates a mask that provides for directing the operation of neural networks, by allowing an external control source to focus the attention of the neural network toward solutions in a selected domain or semantic context. This is achieved through a control mask that individually and variably affects the threshold settings of the neurons. The invention is broadly applicable to problems in signal and image processing, and provides an essential component for the integration of neural networks into current and further embedded computing system.

BRIEF DESCRIPTION OF THE DRAWINGS

FIG. 11 illustrates the relationships among an object, an obstruction and mask.

FIG. 13 shows the output display of a Pascal program which reveals the network control capability provided by the invention.

DESCRIPTION OF THE PREFERRED EMBODIMENTS

The present invention makes possible the embedding of neural networks in deployed systems alongside existing the currently evolving techniques such as algorithmic computing and artificial intelligence Neural networks do not supplant either of these approaches. The invention provides for instead hybrid systems in which the three operate cooperatively to produce a total system which is more adaptive and efficient than any one approach could provide. An example of such a system employs a conventional general purpose processor, a rule-based expert system, and the neural network invention. The neural network invention augments the expert system by rapidly processing computationally complex portions of the problem and by heuristically searching the knowledge base. It also reduces or transforms raw input data too massive to be handled by the general purpose processor.

Prior to the present invention, a major problem in the realization of such a hybrid system was the interfacing of its components. Although a neural co-processor architecture may resolve many of the physical interface problems and allow complex networks of neural networks (neural clusters) to be included and evolved in the system without seriously disrupting the other components the co-processor design itself does not solve problems of data representation and external control. It also does not provide a sufficiently convenient means of combining existing neural network forms to form various neural cluster architectures. The present invention solves these problems.

Figure 4B:
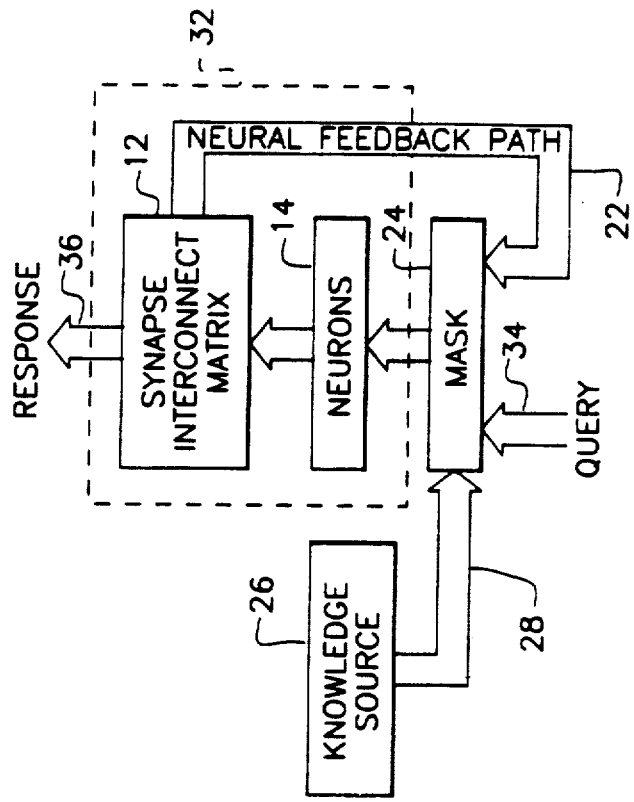
FIG. 4b is a block diagram of another embodiment of the invention.
Figure 4A:
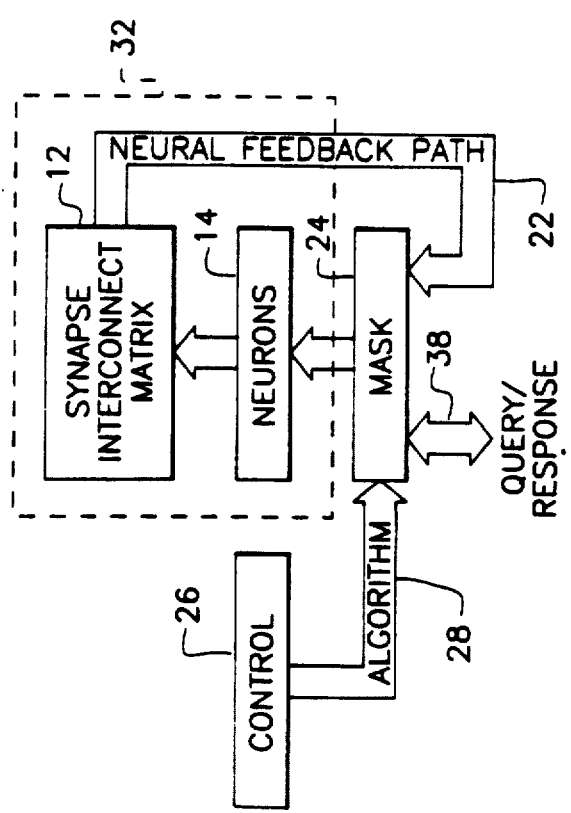
FIG. 4a is a block diagram of an embodiment of the invention.

FIG. 4a is a block diagram of the invention. The synapse interconnects 12 and the neurons 14 correspond to those of the prior art neural network 30 in FIG. 2. However, the neural feedback loop 22 of FIG. 4a is not like at of feedback loop 18 of FIG. 2 in that loop 22 is fed through mask prior to entry to neurons 14. FIG. 4b is another embodiment or configuration of the invention. The notable difference between them is the input/output ports. FIG. 4a has the input and outputs at location 38 whereas FIG. 4b shows input (query) port 34 only into mask 24 and output (response) port 36 exiting synapse interconnect 12.

External source of control 26 (e.g., an algorithm can via a path of control 28) influences the normally unrestricted operation of a neural network 32 such as, for example, the Hopfield Associative Content Addressed Memory (ACAM), causing it to behave in a desired fashion. The ACAM is essentially represented by FIG. 2. In the invention of FIG. 4a, a control mechanism 26 implements an algorithm that directs the associative search by imposing weighting on neurons 14. In the invention of FIG. 4b, a rule-based knowledge source determines the weighting. Mask 24 focuses the neural response by influencing the initial and subsequent neural states. For instance, data representation and net convergence may be controlled. Data values stored in the synaptic weights at synapses 12 of the Hopfield ACAM can be retrieved by supplying only a portion of the stored value as an input query. When an inexact or incomplete query is supplied, the ACAM responds with the "closest" stored value. Unfortunately, the Hopfield ACAM defines closeness in terms of data coding pattern similarity as measured by Hamming distance. This retrieved value will be the one which is most similar to the query. For example, if values are encoded in binary, the number eight (1000) is closer (more similar) to twelve (1100) than it is to seven (0111). It would be more useful if the distance measure were the familiar concept of numeric difference. This would allow the data to be stored in the ACAM using the usual binary representation used by conventional computing components. The present invention achieves this goal through the action of an external source of control that directs the state transitions of the neural network (via a control input the mask) toward desired neural states and away from others.

Various attempts to achieve associative search based on closeness have been unsuccessful. For instance, researchers at the Jet Propulsion Laboratory demonstrated an implementation of a Hopfield ACAM connected to a small minicomputer. They used a non-binary sparse coding scheme to encode alphanumeric characters. They also employed an automatic control that raised or lowered the threshold of all the neurons based on the output of the network's synaptic matrix. When given a query equidistant from two stored values, their network did not find either value. The network's "error correction" capabilities could not be controlled. The researchers' automatic threshold control wasted the control capability potentially available on the individual threshold inputs 15 of the neurons by bussing them all together.

Figure 5:
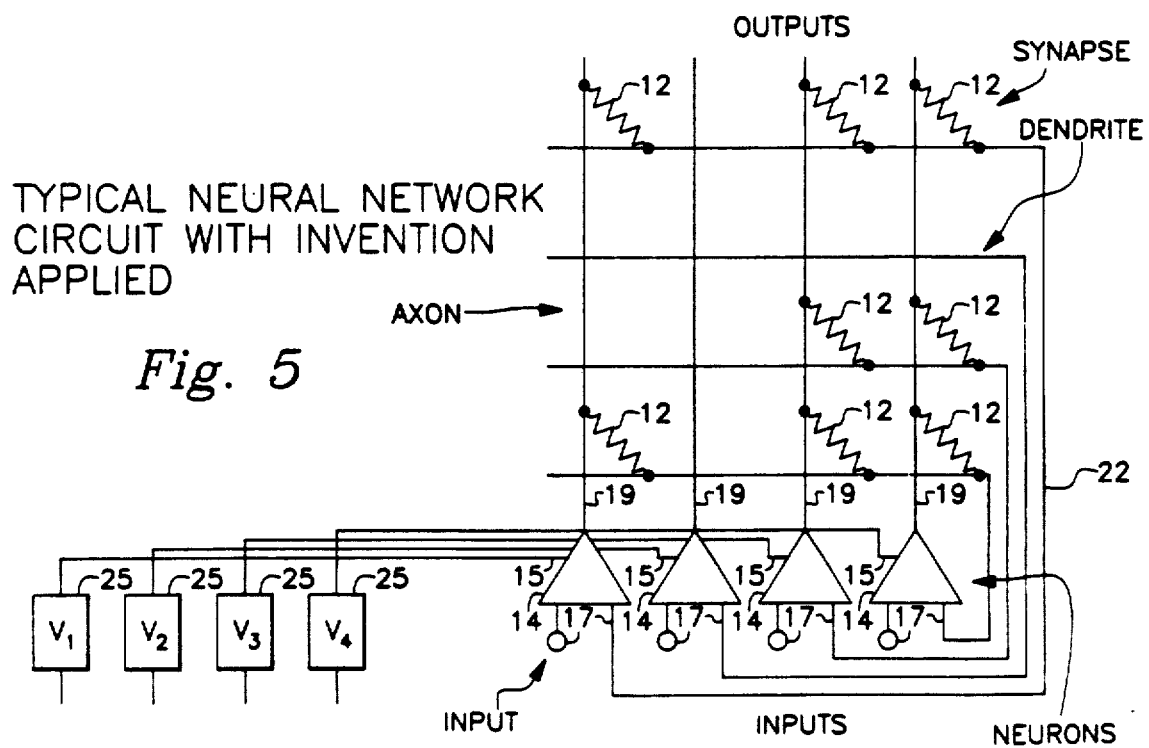
FIG. 5 is a basic schematic of the invention.

The present invention, as shown in FIG. 5, controls the thresholds 15 of arbitrarily selected neurons. The threshold controls are mask elements 25 set by control source 26 external to the network. Elements 25 together with control 26 direct a net convergence toward a desired result. Such control or mask element 25 allows neurons, representing the most significant bits of a binary code, to be made more difficult for the network to change, thereby allowing binary coding and simultaneously restricting "error correction" to the least significant bits. In the case of an ambiguous query, selective threshold control 25 also allows a priori knowledge to specify a part of the query as more important than other parts. The present invention provides a standardized source of threshold control 25 from the network's point of view, with a mask 24 consisting of a vector of values, one for each neuron in the network. Numeric distance search is implemented as a series of searches beginning with one in which all but a few of the least significant neurons are held in their initial query state. If the network does not find a stored value under these conditions, then the hold on some of the neurons is relaxed, proceeding from the least significant end, through a "relaxation algorithm" described below. This algorithm is not applicable in certain data cases. Two other algorithms implement numeric distance search.

Numerous methods exist for modeling and describing the behavior of neural networks Hopfield's geometric analogy based on energy is the most intuitive and is particularly helpful in describing the present invention. Each neuron 14 can take on a range of output values, usually ranging from zero to one (or alternatively −1 to +1). This range is a linear dimension describing the state of neuron 14. The state of a network of neurons is then defined by the states of its individual neurons 14. A network of three neurons will have a state corresponding to a point within a the cube defined by an orthogonal arrangement of the dimensions of its individual neurons. When all neurons 14 are at maximum or minimum values, the state of the network is at a corner of the cube. When their outputs are at intermediate values, the state of the network is somewhere within the interior of the cube. This view is extendable to N neurons with the state space describing all possible network conditions being an N-dimensional cube.

Neural state transitions cause the point describing a network's state to move around within the N-dimensional cube. These transitions are caused by the weighted influence of one neuron on another much the same as the electromagnetic field surrounding a charged particle influences its neighboring particles. At any point in a network's state space, there is an associated force or potential energy, reflecting the combined weighted states of all the neurons, that pushes the network's state to another point in the state space. Stable states are points at which the forces counteract sufficiently that result in no neural state changes. Once the network state reaches one of these points, it remains there.

An image of the N-dimensional state space may be projected onto a two dimensional plane just as the edges and vertices of a three dimensional cube can be drawn on a piece of paper. The energy field can then be described as a distortion or stretching of the two dimensional plane in a third dimension creating hills and valleys. The network's state then acts like a marble rolling on this surface. If the network is started at a high point, the energy (i.e., height) causes it to roll "downhill" until it reaches a nearby depression. In the case of an ACAM, these depressions or points of local minimum energy correspond to the stored memories The shape of the surface is controlled only by the location of stored memories. The stable state eventually reached by the network is not necessary the deepest depression The direction of the state transitions is not controlled.

The present invention provides a mechanism for influencing the direction of state transitions. By specifying mask values 25, an external source of control 26 can distort (i.e., raise or lower) the energy value of a particular dimension (i.e., neuron) in the state space. This is analogous to raising hills on the energy surface so that state transitions are directed away from one portion of the state space and toward another portion. This may not result in network stabilization at the absolute deepest minimum, but it will define transition directions which lead toward particular classes of minima and away from others. Network state transitions are not based solely on the data content of the network as in prior art schemes. In an ACAM, the invention controls retrievals in order to meet externally specified search criteria. Likewise, the operation of other neural network forms can be externally directed to produce desired forms of behavior.

The primary parts of the invention include the mask 24, the algorithm, and the control source 26. Mask 24 provides a simple, yet a flexible standard control interface 28, between the network 32 and an external source 26 of the mask 24 control. Mask 24 is a vector of numeric values 25, one per neuron 14, that can be translated into signals which influence the operation of the neurons 14. There are various options for the implementations of the mask 24 in terms of values 25 and its connection 15 to the neurons 14. The various implementations have subtle but significant variations in the operation, utility, and consequent application of the controlled mechanism.

One mask form is a logical representation in which the mask 24 merely specifies, in binary terms, which neurons 14 are critically significant and which are not. This form does not require the control source 26 to specify the values of the significant neurons 14. A flexible variant of this form employs continuous mask 24 values 25, rather than binary, so that variations in significance can be specified.

In another form, values 25 contained in the mask 24 may be neural, reflecting and/or generated by outputs 19 of neurons. This form is particularly appropriate when another neural network is used as the external source 26 of control. Values 25 for this form may be binary or continuously variable.

For a third form, values in mask 24 may be synaptic, reflecting and/or generated by synaptic interconnection matrix 12. Since a neuron 14 fires when the sum of its synaptic inputs 17 exceeds its threshold 15, this form of mask 24 mates well with an implementation based on threshold control 15.

A mask 24 form may have values that are be temporal, reflecting some timing or persistence aspect of the neurons 14 to which they are connected. The operation of the network can be controlled by causing neurons 14 to hold new states for a specified (absolute) length of time. Once neuron 14 fires, or ceases firing, it may stay in that new state for at least some minimum time. Mask 24 can specify a set of time values 25, thereby controlling the variability of individual neurons 14. This form is not particularly compatible with many current neural models, since they often do not provide for representation of temporal information.

A fifth but related form of mask 24 is a mask of inertial values. An inertial mask controls the state hysteresis of the neurons 14. The new dual-coded neurons defined by the applicant (having some transfer functions like these shown in FIGS. 6a and 6b) have positive and negative thresholds which can be set externally (i.e., by mask values 25). By properly adjusting these thresholds 15, the state transitions of a network can be controlled to direct the attention of the network either toward or away from selected characteristics.

The inertial control mask may be connected to an RC time constant term used in many current neuron models. However, the inertial characteristic of neurons are modeled here in a less electrical way using the dual-coded neurons described above. This modeling is an extension of tri-state neurons described below.

Mask 24 controls the individual neurons 14. While mask 24 itself forms a standard mechanism for accepting externally specified control inputs from a control source 26, there is a number of implementation options useful in connecting mask 24 to neurons 14. These options have subtle but significant variation in the operation, utility, and consequent application of the controlled mechanism. The effect of control is to continually direct the operation of the network toward a specified goal or desired result.

Figure 3:
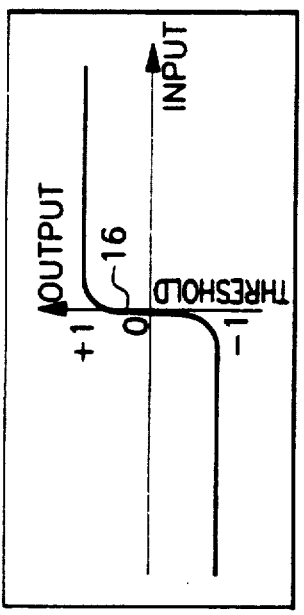
FIG. 3 reveals a basic threshold function as a sigmoid transfer function.

All neuron models and implementations have some sort of threshold, either explicitly or implicitly. Even continuous neurons such as those with a sigmoid transfer function 16 (as shown in FIG. 3) have a threshold because the sigmoid is defined relative to some origin (often zero). Many neuron models of the prior art do not utilize threshold 15 as a variable network parameter. The threshold input 15 is a convenient point to connect mask 24. External constraint of neural network operation may be in terms of threshold control. By raising the threshold of selected neurons 14, mask 24 causes them to be more difficult to fire and directs the network toward states in which neurons 14 are off. Conversely, by lowering threshold 15 of selected neurons 14, mask 24 causes them to be easier to fire and directs the network toward states in which those neurons 14 are on. Here, one difficulty of some forms of control is that external control source 26 may need input concerning the desired values of neurons 14 rather than just which neurons 14 are important.

A simpler method of influencing neurons 14 is output control 22. Mask 24 can be used to specify a fixed or limited output value for the neurons 14. This specifying is similar to an experimental procedure called "clamping" which has been used by some researchers. Clamping is simply the process of holding the output values of some neurons 14, the "inputs," while the remaining neurons 14 in the network are allowed to transition freely. The present invention differs from this experimental procedure in that it incorporates a mask to flexibly specify which neurons 14 are to be clamped, in that the clamping strength is adjustable or variable for each neuron rather than absolute or constant, and that the purpose of control is to specify the relative significance of one group of neurons 14 over another even as they (potentially) change state and not to enforce them as fixed stimuli.

In simulations, an alternative form of output control based on substitution has been used. Each cell of mask 24 can be specified or not. Those cells which are specified indicate a desired partial neural network output state. These mask cells replace normal network neurons 14 during simulation. Original network neurons 14 are retained, but their outputs 19 have no influence. This allows one to see what new states they would have assumed if mask 24 had not been enforcing the output values.

The point of neuron control need not be unconventional. Simple input stimulation can be used with almost any of the neuron models popular today. If mask 24 is connected to a neuron's input 17 it can be used to push that neuron closer to or farther from its firing threshold. External input values are covered by a term in the network's energy equation in such a way that increasing an input value decreases the net's energy. Depending on scale, mask 24 may act like more than one input and thus dominate internal network forces. Note, however, that additional input stimulation is subtly different from threshold variation and may not be as generally useful. For example, common continuously bounded neurons have an input saturation limit beyond which additional input stimulation produces no change in output 19. If the neuron's input stimulation is increased, its available input range is effectively decreased. Threshold control does not have this limitation. It shifts the range without decreasing it.

Another way that mask 24 may control the operation of a neural network is by influencing the stimulation time of the neural inputs 17. The mask may enforce maximum or minimum (or both) stimulation pulse size by stretching, quenching, or restricting input pulses to a controlled range of durations. This amounts to a temporal filtering of inputs 17. Neurons 14 for which mask 24 specifies that a long duration input is required will not be changed by spurious transitions of other neurons 14. They will change state only when there is consistent pressure from the other neurons 14. This mechanism is useful in directing the network's behavior.

Figure 7A:
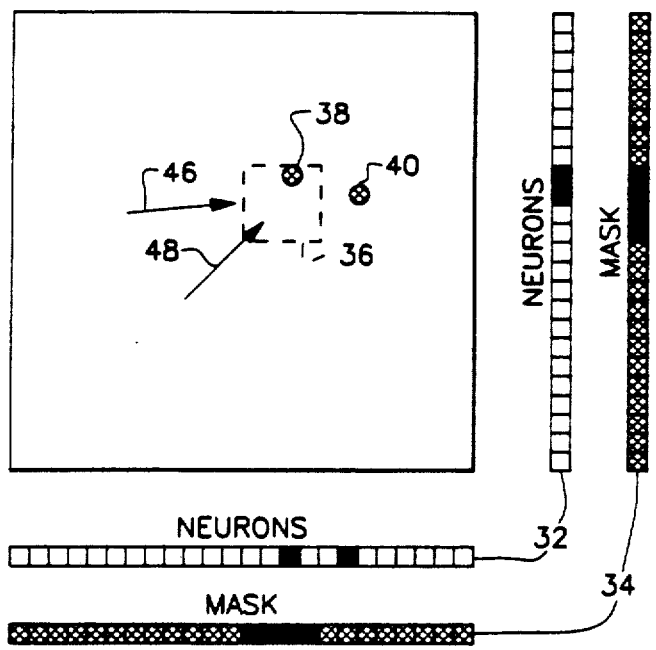
FIG. 7a and 7b illustrate the mask and neurons in relation to tracking.

The application of neural networks to the tracking problem is shown in FIG. 7a in an unencoded form. The information on the neurons and masks is not encoded in an arbitrary (e.g., binary) code. The query 32 shown on the neurons indicates location 36 near which targets 38 and 40 are sought. The region 36 defined by the intersection of the two masks is the area on which the net's attention is to be focused. The goal is to have the net find one of the recent sightings 38 and 40 which is in area 36 of interest Vectors 46 and 48 represent movement of targets 40 and 38, respectively.

Figure 7B:
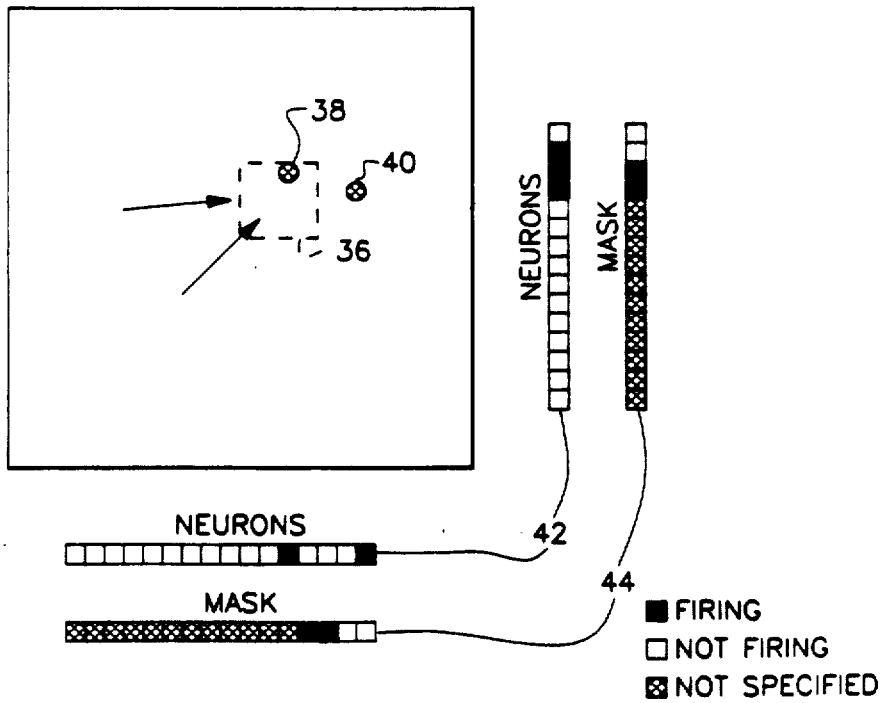

The application of neural networks to the tracking problem is shown in FIG. 7b in a coded form. The information on the neurons and masks in boxes 42 and 44, respectively, is encoded in a binary code. The point specified by the value on the neurons indicates location 36 near which targets 38 and 40 are sought. The box 44 of coordinates defined by the values enforced by the masks is the area 36 on which the net's attention is to be focused. Again, the goal is to have the net find one of the recent sightings 38 and 40 which is in the area of interest 36.

Figure 8:
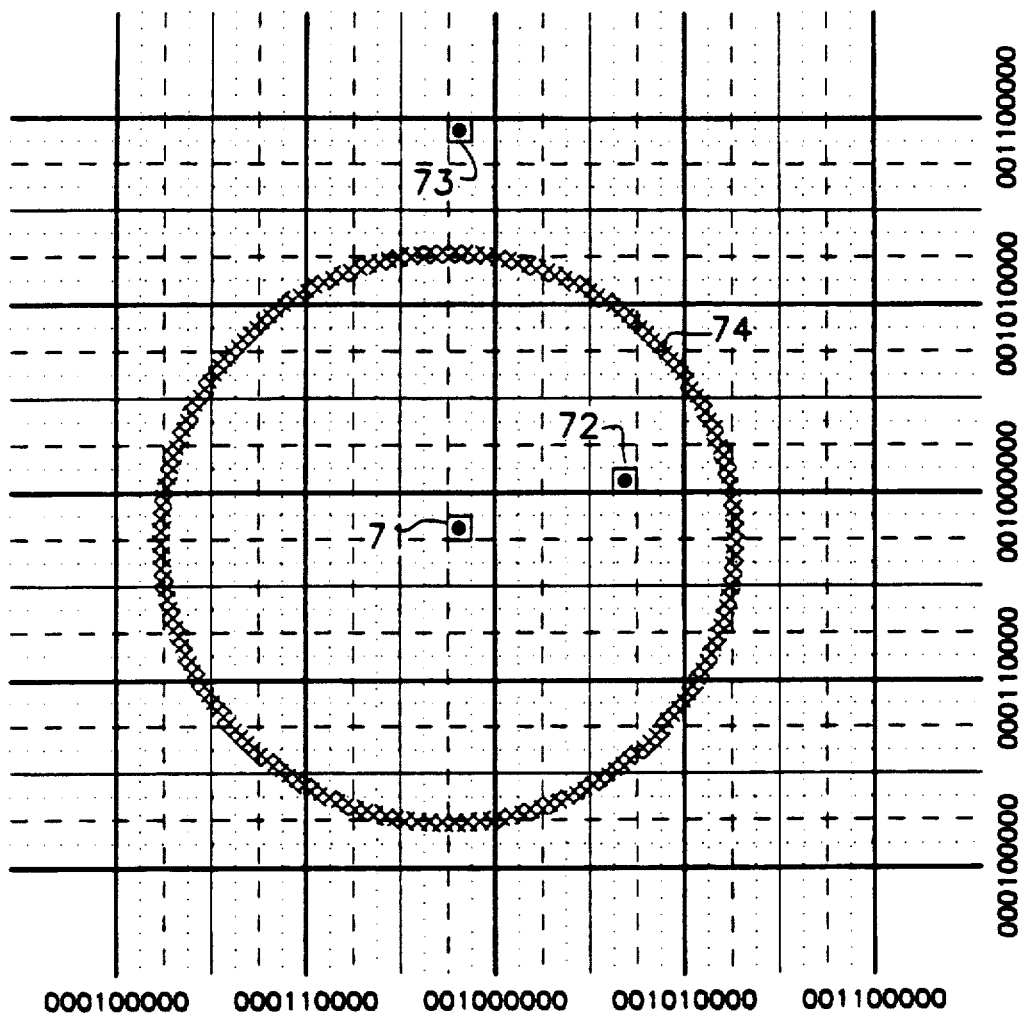
FIG. 8 shows a map coordinate search example.

A program written by the applicant demonstrates the capability of the relaxation algorithm used in association with a map coordinate search example as shown in FIG. 8. FIG. 8 shows the result of the ensuing Pascal program which shows that when the algorithm is applied (via mask 24), the simulated neural net finds the physically nearer target 72 instead of target 73 to point 71. Target 73 is closer in Hamming distance (bit similarity) to point 71 than target 72. The goal is to find any target inside circle 74 because such target is within range by actual measure even though some targets (e.g., target 73) outside circle 74 may be closer in Hamming distance.

Figure 9:
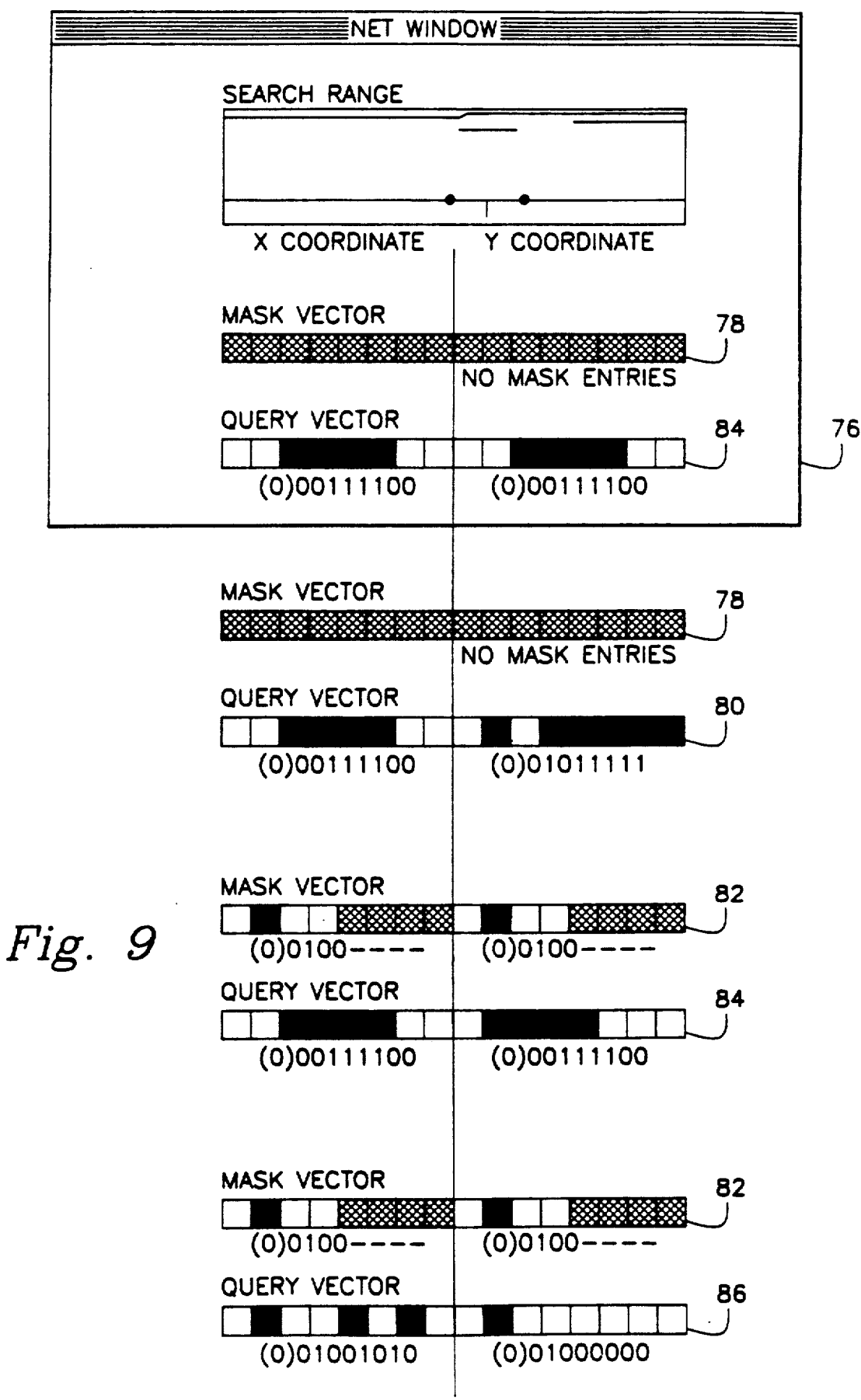
FIG. 9 reveals a progression of mask and query values for finding the nearest target.

FIG. 9 indicates the process of finding the nearest target. Display 76 shows the mask and query values 84 corresponding the point 71. Mask vector 78 has no value yet. The uncontrolled response 80 to query vector 84 corresponds to target 73 which is undesirable. Mask vector 82 value focuses the net's attention on a square region of the map (in FIG. 8) containing target 72. Query vector 84 value corresponds to point 71. Controlled response 86 to query 84 corresponds to target 72. The net has found a stored memory in the desired region. FIG. 13 shows the output display produced by the program.

The essence of the following program starts with the loading of target coordinates into a neural net: target 72 001001010001000000 and target 73 000111100001011110. A conventional Hopfield neural net associative memory search is made with a query "000111100000111100." The match found is "0001111000001011110" which is near by Hamming difference, not by map distance. Next a search is made with a mask of the present invention that communicates what "near" means. The mask is "100**100**." The match found is "001001010001000000." The latter match reveals the truer sense of "near." This network control capability is revealed by the following program.

```
program main (input, output);
   const
      VectorSize = 18;
   type
      NeuronStates = -1..+1;
      NeuronVector = array[1..VectorSize] of
         NeuronStates;
      SynapseVector = array[1..VectorSize] of
         Integer;
      SynapseArray = array[1..VectorSize] of
         SynapseVector;
   var
      InVec, OutVec : NeuronVector;
      Tij : SynapseArray;
      MaskVec : NeuronVector;
      WindowSize : Rect;
   {---------------------------------}
      procedure InitVector (var theVector :
         NeuronVector;
         theInitValue : integer);
```

```
    var
      i : integer;
  begin
    for i := 1 to VectorSize do
      theVector[i] := theInitValue;
  end; {InitVector}
{------------------------------}
  procedure PrintVector (thePrompt : String;
       theVector : NeuronVector);
    var
      i : integer;
  begin
    write(thePrompt);
    for i := 1 to VectorSize do
      case theVector[i] of
        -1, +1:
          write(trunc((theVector[i] + 1)/2)
           : 1);
        0 :
          write('*');
        end; {case}
      writeln;
    end; {PrintVector}
{------------------------------}
  procedure StoreMemory (var theMatrix :
       SynapseArray;
     theVector : NeuronVector);
   var
```

```
      i, j : integer;
  begin
    for i := 1 to VectorSize do
      for j := 1 to VectorSize do
        theMatrix[i, j] := theMatrix[i, j] +
        (theVector[i] * theVector[j]);
    for i := to VectorSize do
      theMatrix[i, i] := 0;
  end; {StoreMemory}
{------------------------------}
  procedure InitMatrix (var theMatrix :
      SynapseArray;
      theInitValue : integer);
  var
    i : integer;
    j : integer;
  begin
    for i := 1 to VectorSize do
      for j := 1 to VectorSize do
        theMatrix[i, j] := theInitValue;
  end; {InitMatrix}
{------------------------------}
  procedure PrintMatrix (thePrompt : string;
      theMatrix : SynapseArray);
  var
    i : integer;
    j : integer;
  begin
```

```
      writeln(thePrompt);
      for i := 1 to VectorSize do
        begin
          for j := 1 to VectorSize do
            write(theMatrix[i, j] : 4);
          writeln;
        end
    end; {PrintMatrix}
{--------------------------------}
   function Threshold (theInput :
        SynapseVector) : NeuronVector;
     var
       i : integer;
       temp : NeuronVector;
   begin
     for i := 1 to VectorSize do
       If theInput[i] = 0 then
         temp[i] := 0
       else If theInput[i] < 0 then
         temp[i] := -1
       else
         temp[i] := 1;
   end; {Threshold}
{--------------------------------}
   function Mask (theValue, theMask :
        NeuronVector) : NeuronVector;
     var
       i : integer;
       temp : NeuronVector;
```

```
begin
  for i := 1 to VectorSize do
    If theMask[i] = 0 then
      temp[i] := theValue[i]
    else
      temp[i] := theMask[i];
  Mask := temp;
end; {Mask}
{---------------------------}
function Stable (theInput, theMask,
        theResponse : NeuronVector) :
        Boolean;
  var
    i : integer;
begin
  Stable := True;
  for i := 1 to VectorSize do
    If theMask[i] = 0 then
      If theInput[i] <> theResponse[i] then
        Stable := False;
end; {Stable}
{---------------------------}
function Valid (theResponse, theMask :
        NeuronVector) : Boolean;
  var
    i : integer;
begin
  Valid :=True;
```

```
    for i := 1 to VectorSize do
      If theMask[i] <> 0 then
        If theMask[i] <> theResponse[i] then
          Valid := False;
  end; {Valid}
{-------------------------------}
  function Query (theQuery, theMask :
        NeuronVector;
        theMatrix : SynapseArray;
        theLimit : integer;
        var theResponse : NeuronVector) :
        Boolean;
    var
      i, j, count, sum : integer;
      InternalQuery : NeuronVector;
      theSynapse : SynapseVector;
      Finished : Boolean;
  begin
    Finished := False;
    count := 0;
    InternalQuery := Mask(theQuery, theMask);
    repeat
      for i := 1 to VectorSize do
        begin
          sum := 0;
          for j := 1 to VectorSize do
            sum := sum + (theMatrix[i, j] *
            InternalQuery[j];
```

```
            theSynapse[i] := sum
          end
        theResponse := Threshold(theSynapse);
        Finished := Stable(InternalQuery,
          theMask, theResponse);
        InternalQuery := Mask(theResponse,
          theMask);
        count := count + 1;
      until (count >= theLimit) or Finished;
      Query := Finished and Valid(theResponse,
        theMask);
    end; {Query}
{------------------------------}
    procedure SetVector (var theVector :
          NeuronVector;
            theString : string);
      var
        i : integer;
        n : longint;
        c : char;
    begin
      for i := 1 to VectorSize do
        begin
          c := copy(theString, i, 1);
          If c = '*' then
            theVector[i] := 0
          else
            StringToNum(c, n);
            theVector[i] := (2 * integer(n) - 1;)
```

```pascal
      end
    end; {SetVector}
{------------------------------}
  procedure EnterVector (var theVector :
        NeuronVector;
        thePrompt : string);
    var
      theString : string;
  begin
    write(thePrompt, ': ');
    readln(theString);
    SetVector(theVector, theString);
  end; {EnterVector}
{------------------------------}
  procedure SetMask (var theVector :
        NeuronVector;
        theString : string);
    var
      i : integer;
      n : longint;
      c : char;
  begin
    for i :=1 to VectorSize do
      begin
        c :=copy(theString, i, 1);
        If c = '*' then
          theVector[i] := 0
        else
```

```
            begin
                StringToNum(c, n);
                theVector[i] := (2 * integer(n) -
                1);
            end
          end
       end; (SetMask)
{--------------------------------}
   procedure EnterMask (var theVector :
      -/   NeuronVector;
           thePrompt : string);
      var
         theString : string;
   begin
      write(thePrompt);
      readln(theString);
      SetMask(theVector, theString);
   end; {EnterMask}
{--------------------------------}
   procedure PrintBanner;
   begin
      writeln('This program is the first
              demonstration');
      writeln('  of the feasibility of the
              Relaxation Algorithm.');
      writeln;
      writeln('It was first functional on
              April 20, 1987.');
      writeln('Written by James A. White using
```

```pascal
            Lightspeed Pascal for the
        Macintosh.');
    writeln('See the associated Map
        Coordinate Search Example diagram.');
    writeln;
  end; {PrintBanner}
{--------------------------}
  procedure Delay;
    var
        i, j : integer;
    begin
        for i := 1 to 20 do
        for j :=1 to 30000 do
            {nothing}
    end; {Delay}
{--------------------------}
  begin {main program}
    HideAll;
    SetRect(WindowSize, 5, 40, 507, 337);
    SetTextRect(WindowSize);
    TextFont(Monaco);
    ShowText;
    PrintBanner;
    InitMatrix(Tij, 0);
    writeln('First load the target
        coordinates into the neural net.');
    SetVector(InVec, '001001010001000000');
    PrintVector('Target 2: ', InVec);
```

```
StoreMemory(Tij, InVec);

SetVector(InVec, '000111100001011110');

PrintVector('Target 3: ', InVec);

StoreMemory(Tij, InVec);

writeln;

writeln("Now try a conventional Hopfield
    neural net associative memory
    search.');

SetVector(InVec, '000111100000011100');

PrintVector('   Query: ', InVec);

SetMask(MaskVec, '******************');

If Query(InVec, MaskVec, Tij, 20, OutVec)
    then
  begin
    writeln('Match Found.');
    PrintVector('Response: ', OutVec);
  end
else
  writeln('No Match.');
writeln('That''s near by Hamming
    difference, but not by map
    distance');
writeln;
writeln('Now try it with a mask that
    communicates what NEAR means.');
SetMask(MaskVec, '100**100**');
PrintVector('   Mask: ', MaskVec);
If Query(InVec, MaskVec, Tij, 20, OutVec)
```

```
            then
         begin
            writeln('Match Found.');
               PrintVector('Response: ', OutVec);
            end
         else
            writeln('No Match.');
         writeln;
         writeln('It works! Archive the program
               for the record.');
         writeln('(Program will exit in a few
               seconds.)');
         Delay;
      end. {main program}
```

Figure 10:
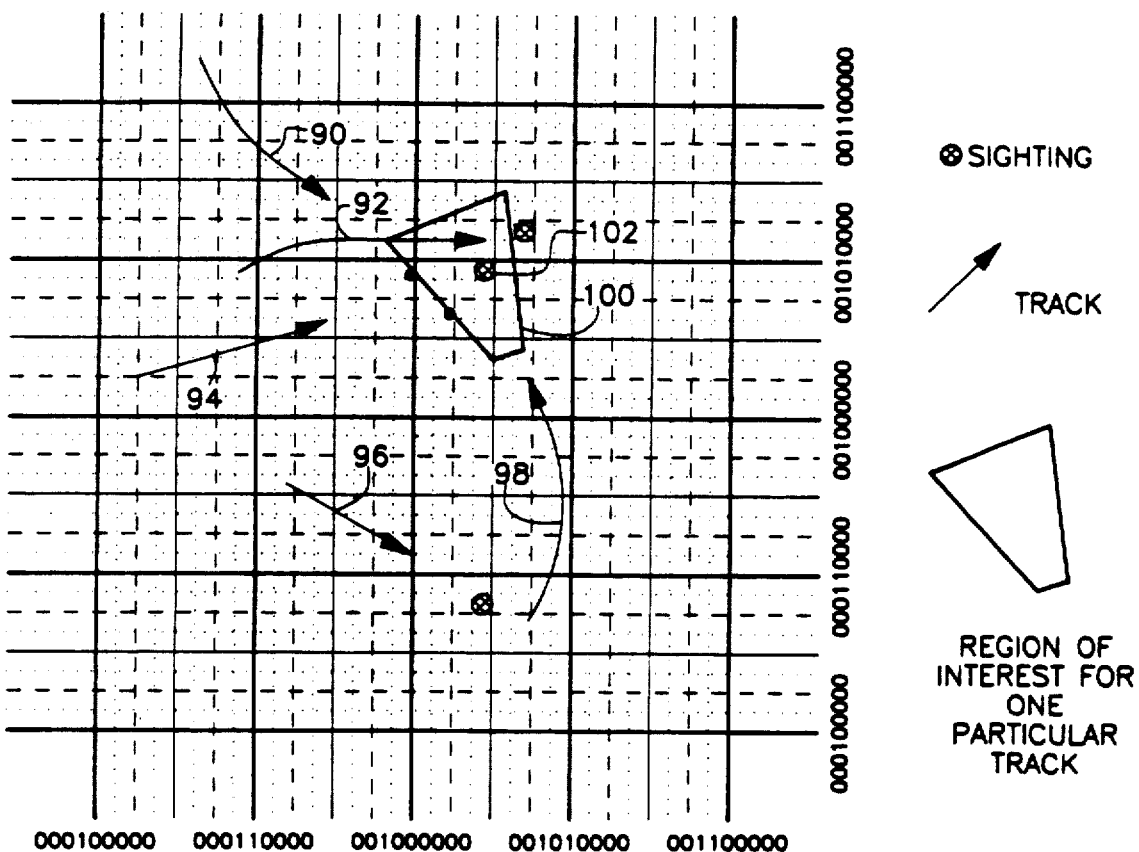
FIG. 10 shows a target tracking example of the invention.

Figure 10 shows a target tracking application of the invention. Each track (90, 92, 94, 96 and 98) is extrapolated (one at a time) so as to identify region 100 of the map where the object or sighting 102 associated with the respective track is likely to be found. Then the invention can be used to focus the attention of a neural network which knows the latest sightings to the region of interest. This simplifies the track to sighting correlation problem.

In figure 11, display 50 represents 112 neurons arranged as a 7 x 16 array of image pixels. Displays 52 and 54 reveal two image memories stored in the interconnect matrix of the neural network. Display 56 shows query data which is a scene to be analyzed by the neural network. This scene contains a FIG. 10 shows a target tracking application of the invention. Each track (90, 92, 94, 96 and 98) is extrapolated (one at a time) so as to identify region 100 of the map where the object or sighting 102 associated with the respective track is likely to be found. Then the invention can be used to focus the attention of a neural network which knows the latest sightings to the region of interest. This simplifies the track to sighting correlation problem.

In FIG. 11, display 50 represents 112 neurons arranged as a 7×16 array of image pixels. Displays 52 and 54 reveal two image memories stored in the interconnect matrix of the neural network. Display 56 shows query data which is a scene to be analyzed by the neural network. This scene contains a tank obscured by a barn. Display 58 is the uncontrolled (unfocused) response of the neural net. The barn is identified because it is most similar to the query. Display 60 has a mask value to accompany the query. This mask is merely a selected region of interest from the image. In some embodiments of the invention, it is not necessary for the mask to specify the value of pixels in the region of interest. Display 62 is the controlled (focused) response of the neural net when the mask is present along with the query. The tank is identified even though it was only a small part of the scene.

Figure 12:
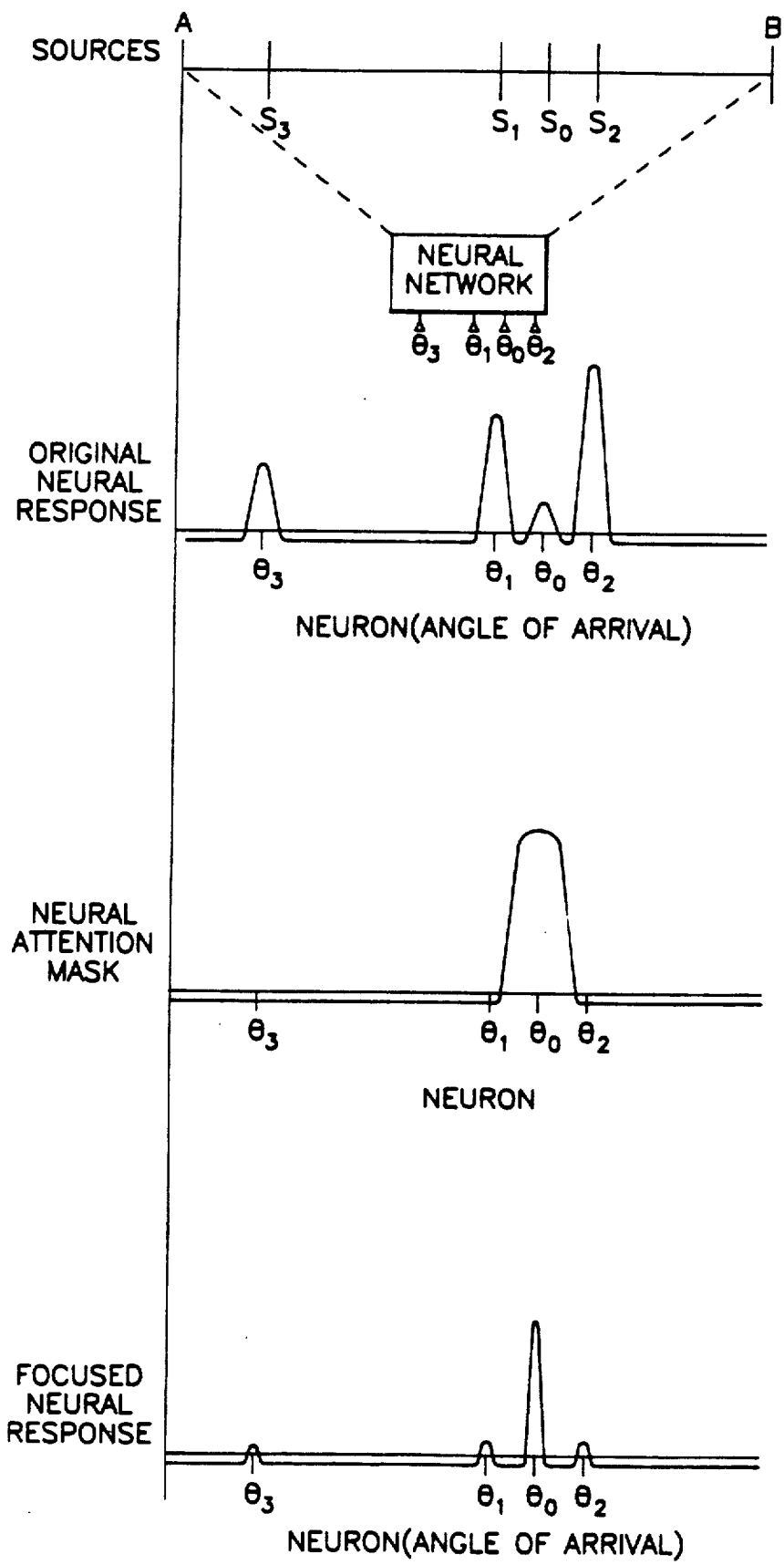
FIG. 12 set for a sequence of attention focusing essentials.

FIG. 12 illustrates the essentials of attention focusing which can be used to select and isolate a single signal so that it can be detected in the presence of noise, jamming, or competing adjacent signals. A snapshot of sensor data is projected onto the neural network. As the network is iteratively updated, the neural state converges to a pattern identifying the angles of arrivals of the detected signals ($S_0$ through $S_3$. Some responses may be ambiguous or of interest for strategic reasons. The neural attention mask can be used to direct the network to focus its attention on selected signals or ranges. This effectively suppresses dominant signals while emphasizing signals of interest.

An alternative technique is to suppress strong signals in order to detect additional signals of lesser magnitude. The network's signal detection performance can be improved by initially allowing it to converge normally while monitoring its outputs for conditions which indicate potential deterioration. Then, by focusing the attention of the network on selected signals, accurate detection will be obtained. When a neural response has exceeded a set level, detection at the corresponding angle of arrival can be declared. In subsequent network iterations that response can be suppressed, thereby directing the attention of the network toward the remaining signal direction. If necessary, processing can be used iteratively or restarted from the original snapshot without recomputing network parameters.

Since one useful application of the present invention is in hybrid computer system which contains both neural networks and conventional computing elements, it is advantageous to be able to translate data to and from the forms used in these two computing paradigms. Conventional computers are based on binary data representation. Their smallest element of information is the bit which represents a binary digit (one to zero). Neural networks are based on activation levels which have continuous (analog) characteristics. It is not necessary, however, to explicitly convert analog activation levels to binary codes when merging these two paradigms. Neural networks compute a logical decision function when they fire, thereby producing a binary output (e.g., firing = one, not firing = zero). Unfortunately, the correspondence is not quite appropriate. The concept of data validity (i.e., presence) must be considered.

In a neural network, when a neuron fires, it means some information has been obtained. When it does not, it means nothing (i.e., no stimulation has been received). A firing neuron can represent a one, but the absence of that firing does not necessarily mean zero. It just means there is not a one. Representation of a zero requires the firing of another, different neuron. If both neurons fire, the stimulus in ambiguous, which may be considered equivalent to no information at all. In simple terms, neural outputs are fundamentally unary (not binary) devices.

To facilitate neural representation of binary data, one may conceptually group pairs of neurons, one representing zero, the other presenting one, into a slightly more complex composite neuron with three states (i.e., zero, one, and null). This allows one to capture both binary and validity information in a single neuron. Data translation between paradigms is simplified as are physical interfaces. Implementation of tri-state neurons can be accomplished by inverting the circuitry of one neuron so that it operates on negative voltages, and connecting its input and output in parallel with those of an uninverted neuron. The resulting transfer function has a threshold at zero (where its output is zero representing a null) and an output which ranges from minus one (representing a binary zero) to plus one (representing a binary one).

An additional advantage of tri-state neurons is the view they provide of the network state space. In the unary model, the current state is a single point. The presence of that state in some regions of the space indicates that no data is present (i.e., no neurons are firing). The tri-state model can be mapped into a state space in which every region represents a binary number. In this space, when one or more neurons are null, the current state becomes like a blob spread over the ambiguous values. Some preliminary experiments suggest that when the neural network state settles into a local minimum, it may be possible to nudge it out of stability and down the energy surface by forcing it to be partially ambiguous. The ambiguity disperses the current state so that some part of it flows outside the peaks surrounding the local minimum and down to another minimum dragging the remainder of the state with it.

Figure 6A:
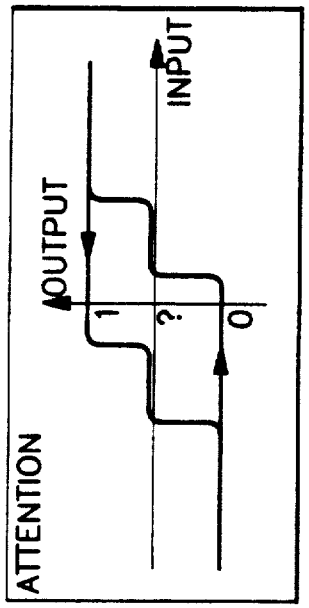
FIG. 6a and 6b show transfer functions of dual-coded neurons.
Figure 6B:
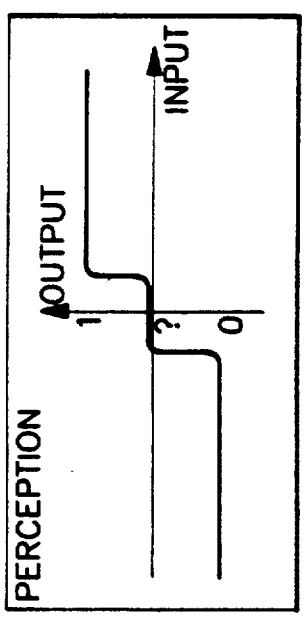

Conventional neuron models exist in both discrete and continuously value forms. The difference between the models is primarily in the shape of their transfer function, although one form (discrete) requires substantially less computation for simulation. There is an extension of the tri-state model to the continuous realm which may be called "dual-coded neurons". FIG. 6a and 6b shows transfer functions of dual-coded neurons for perception and attention, respectively. In defining this extension, one can incorporate control inputs that allow the mask to specify the neuron's inertial characteristic. Dual-coded neurons are like tri-state neurons in that they have multiple thresholds and three dominant output values. They differ from tri-state neurons in that they have multiple transfer functions which are continuous. Each function controls a different state transition. The transfer function in effect at any time depends on the neuron's state history. By setting the threshold of various transfer function, either individually or in groups, the mask effectively changes the importance of each neuron by determining the direction of network state transitions. Combinations of threshold settings are definable to represent normal, attentive, and distracted behavior. In other words, using dual-coded neurons, a control source external to the neural network can configure the mask to cause the network's attention to be directed toward selected aspects of its state and away from other aspects. This control is applicable to all neural network forms. It can result in goal directed network behavior, nor merely data directed behavior.

To demonstrate the feasibility of neural network controls of the present invention, the basic components, a network, a mask, and a source of control have been simulated. A Hopfield ACAM network has been simulated using tri-state neurons and a neural-valued mask connected to the network via substitution. Display 76 of FIG. 9 is from that simulation. An algorithm was used as the external control because it was simple to define. The goal of this simulated hybrid system was to store binary coded data and rapidly recall the value numerically closest to an input query. The task of the control algorithm was to embody an understanding of basic concepts of binary coding and numeric closeness, relationships not contained in the network's recall mechanism. During recall the algorithm supplied queries and mask values to the network. It evaluated the response and, when appropriate, re-queried the network while directing it (via the mask) toward a potentially more acceptable (i.e., closer or nearer) response.

Two control algorithms were developed for the above simulation. One algorithm based on an expansion search approach, starts by directing the attention of the network to the numeric range immediately surrounding the query value. If no acceptable response is found, the algorithm directs the net toward nearby ranges in an increasing spiral of fixed size blocks on both sides of the query. The second algorithm is more computationally efficient. It uses binary reduction of the search space to rapidly eliminate regions which do not contain acceptable responses. It focuses the attention of the neural network on continually smaller regions, but only activates the network when a response closer than those obtained by previous queries is possible. Since the second algorithm has a minimal internal state and requires very little input from the network, it is a good candidate for implementation using a neural network. A simulation may be constructed in which a learning network can capture the concepts of binary representation and numeric closeness and then be paired with an associative memory network to implement rapid recall of binary coded data by its content. In such a system the learning network would act as the external source of control 26.

In simulations, a simple algorithm was used as an external control source. Simulation emphasis was on the external control source and not on the forms of it. Hybrid systems were envisioned in which the control mechanism was a symbolic processor (i.e., a computer which is designed to manipulate symbolic representations of objects, relationships, concepts, plans, etc). The control mechanism may also be a conventional general purpose computer or even another neural network.

A system architecture has been described elsewhere by the applicant which facilitates the incorporation of neural network computing mechanisms alongside conventional algorithmic and symbolic processing elements. In this architecture the neural network structures are encapsulated within a neural co-processor which provides a structured interface and control environment. These structures may include neural clusters (i.e., networks of neural networks) in which networks control the operation of other networks (e.g., with one network supplying mask values for another, or, if compatible, even acting as the mask itself). The present invention is applicable at both levels: the co-processor and the neural cluster.

The present invention provides a highly flexible and general interfacing of an external control source to a neural network. Consequently, the interfacing is applicable to a wide range of problems where a neural net computation might be augmented or optimized through the incorporation of additional information. Masked-based neural network control has been simulated to investigate the use of a desired form of data representation, i.e., binary codes. Many researchers have found that traditional neural network forms work best when sparse (i.e., uneconomical) coding schemes are used. In developing hybrid computing schemes, it is likely that the symbolic representations used in one part of the system (e.g., trees and graphs) will have to be at least partially reflected in data representations in the neural co-processor. Each representation can be expected to have its own transformation rules and adjacency metrics. The disclosed invention facilitates the use of data representations in the neural network that are not inherently supported by that medium.

The most significant aspect of the present invention is its ability to continuously influence the network's state transitions toward categorically defined goals. This directed convergence is particularly important because it allows a contextual framework to be supplied to the interpretation and processing of data. The external control input to the network provides a means of specifying the characteristics of a network processing activity without exactly specifying it detail.

A related aspect is the concept of prioritized attribute fields. If conceptual data objects, including symbolic representations of real objects, are described and selected by a descriptive vector containing the various possible attributes of those objects, the present invention allows priority relationships to be specified with regard to those fields. Database searches are not based strictly on forms of pattern matching. They can be guided to select matches which also are related to the search query by a specified metric. Objects recognized in an image processing application can be selected not only by their size, shape, color, and intensity, but also can be selected on the basis of a prioritized relationship among those and other attributes.

The present invention directly supports attention focusing and its counterpart, distraction. In the map search example of FIG. 8, the attention of the network is focused on a specified region of the map. In a sonar signal processing application, the rule-based (i.e., symbolic) processor might direct the attention of the neural net toward a specific region around a ship because of previous sporadic sightings tending to indicate a high probability of enemy activity in that area. Alternatively, the network might be directed to be particularly sensitive to selected frequency ranges because of intelligence reports indicating that a particular type of submarine, known to emit those frequencies, is operating in the region. Similarly, the attention of the network might be directed toward a selected potion of a visual scene. In that case, as shown in FIG. 11, the network would normally identify an object, such as a barn, as the primary object; however, by using the mask to indicate a portion of the scene near the edge of the barn, the network is capable of identifying another object, such as a tank, almost totally obscured from view.

Another application for the present invention is ambiguity removal in data analysis. Sometimes input data may be ambiguous, indicating several, equally likely response possibilities. As described earlier, this phenomenon was observed on the Jet Propulsion Laboratory system, and has been repeated in simulation through careful selection of data and query values. In these situations, a neural network may return no response at all. The "marble" rolls along the top of a ridge and off the energy surface entirely, in the state space, never settling into a minimum at all. A control algorithm can be used to sequentially increase or decrease the priority of various portions of the query in order to identify potentially acceptable responses.

The architectural implications of the present invention are significant for the general development of neural network structures. Several valuable types of neural networks are currently known, but very little has been done to identify ways of interconnecting these networks to form larger, more complex networks. By allowing some networks to control or respond to other networks a cooperative system may be developed. The mask of the present invention functions as a standardizing reference point for network interaction. In some cases, where signal strengths and compatibilities are certain, the mask may be absorbed into the outputs of one of the networks.

The present invention is generically applicable to all three major categories of neural networks because it facilitates augmented recall, directed learning, and constrained optimization.

The embodiments of an invention in which an exclusive property of right is claimed are defined as follows:

1. A mask controlled neural network comprising:
    a plurality of neurons;
    a synapse interconnect matrix connected to said plurality of neurons; and
    a mask connected to said plurality of neurons and to said synapse interconnect matrix.

2. Apparatus of claim 1 further comprising a control having an algorithm, connected to said mask.

3. Apparatus of claim 2 wherein said synapse interconnect matrix is connected by a neural feedback path to said mask.

4. Apparatus of claim 2 wherein said synapse interconnect matrix is connected by a neural feedback path to said plurality of neurons.

5. Apparatus of claim 2 wherein each of said plurality of neurons comprises:
    a plurality of summation inputs;
    a plurality of threshold level inputs; and
    a plurality of outputs.

6. Apparatus of claim 5 wherein said synapse interconnect matrix comprises:
    said plurality outputs from said plurality of neurons;
    said plurality of summation inputs from said plurality of neurons; and
    interconnects of various weights among some pairs of the outputs and the inputs wherein each pair of the some pairs comprises one input of one neuron of said plurality of neurons and one output of one neuron of said plurality of neurons, in a prescribed pattern.

7. Apparatus of claim 5 wherein said mask comprises:
    a first plurality of mask inputs connected to said control having the algorithm;
    a plurality of mask outputs having a variety of output values as dictated by said plurality of mask inputs, wherein each of said plurality of mask outputs is connected one-to-one to each of said plurality of threshold level inputs of said plurality of neurons.

8. Apparatus of claim 7 wherein said mask further comprises a second plurality of mask inputs connected to said synapse interconnect matrix.

9. Apparatus of claim 8 wherein said second plurality of mask inputs has a plurality of connections to the plurality of outputs of said plurality of neurons wherein the connections have various weights from weak to strong connections according to a prescribed pattern.

10. A mask controlled neural network comprising:
    neuron means having summation input means, threshold input means and output means;
    interconnect means, connected to said neuron means, for connecting some of the input means of said neuron means to some of the output means of said neuron means; and
    mask means, connected to the threshold input means of said neuron means, for setting thresholds of said neuron means at various levels.

11. Apparatus of claim 10 wherein said mask means has values that are controlled according to an algorithm for setting the thresholds of said neuron means at the various levels.

12. A method for mask controlling a neural network having a plurality neurons, having summation inputs, having outputs, and having an interconnect matrix interconnecting said summation input and said outputs variously with weighted connections having weighting values that signify the strength of interconnections among the neurons, and having threshold inputs, comprising:
    determining goal of said neural network;
    setting a control algorithm to provide variable, specified importance values for accomplishment of the goal;
    providing the variable, specified importance values to a mask;
    holding in the mask the variable, specified importance values; and
    inputting from the mask the variable importance values to the threshold inputs thereby affecting thresholds of said neurons, controlling said neural network and causing said network to attain the goal.

* * * * *

UNITED STATES PATENT AND TRADEMARK OFFICE
CERTIFICATE OF CORRECTION

PATENT NO. : 5,014,219

DATED : May 7, 1991

INVENTOR(S) : James A. White

It is certified that error appears in the above-identified patent and that said Letters Patent is hereby corrected as shown below: On the Title page Under OTHER PUBLICATIONS please correct the spelling of Information after A. Kuh & B.W. Dickinson Under ABSTRACT delete "neutral" and insert --neural--

Under ABSTRACT delete "appliciable" and insert applicable"

Column 1, line 1, delete "CONTROLED" and insert --CONTROLLED--

Column 1, line 50, insert --.-- after mappings

Column 1, line 57, delete "dimensional" and insert --directional

Column 1, line 58, delete "on" and insert --of--

Column 1, line 65, delete "ar" and insert --are--

Column 2, line 5, delete "through" and insert --though--

Column 2, line 7, insert --.-- after feedback

Column 2, line 9, delete "adjust" and insert --adjusts--

Column 2, line 53, delete "further" and insert --future--

Column 2, line 54, delete "system" and insert --systems--

Column 3, line 12, delete "set" and insert --sets--

Column 3, line 12, delete "for" and insert --forth--

Column 3, line 54, delete "at" and insert --that--

Figure 1A:
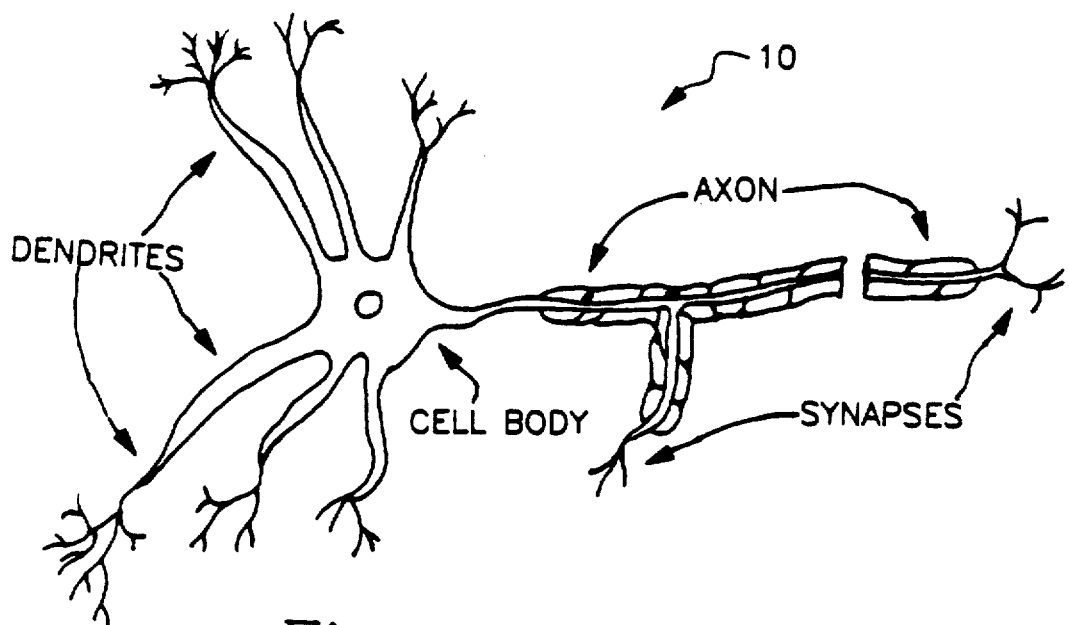
FIG. 1a illustrates a biological neuron.
Figure 1B:
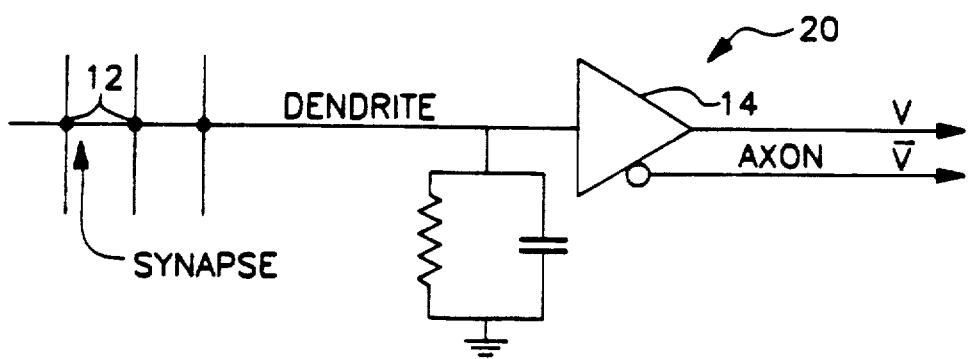
FIG. 1b shows an electronic neuron and associated circuitry.
Figure 2:
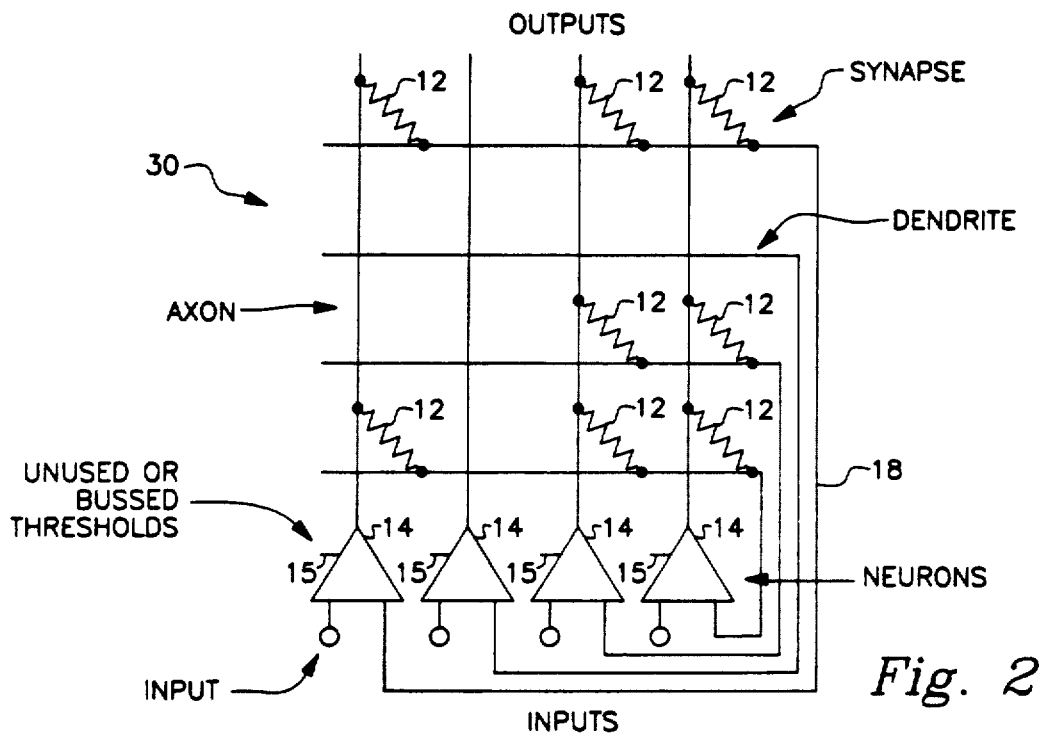
FIG. 2 is a schematic of neurons interconnected in a network topology.

Column 3, line 54, insert --.-- after FIG. 2

UNITED STATES PATENT AND TRADEMARK OFFICE
CERTIFICATE OF CORRECTION

PATENT NO. : 5,014,219

DATED : May 7, 1991

INVENTOR(S) : James A. White

It is certified that error appears in the above-identified patent and that said Letters Patent is hereby corrected as shown below:

Column 3, line 54, delete "in" and insert --In--

Column 4, line 49, delete "a" after direct

Column 5, line 51, insert --.-- after depression

Column 6, line 36, delete "be"

Column 8, line 25, insert --.-- after interest

Column 33, line 35, insert --)-- after $S_3$

Column 34, line 12, delete "in" and insert --is--

Column 34, line 35, delete "regions" and insert --region--

Column 36, line 37, delete "it" and insert --its--

Column 38, line 38, insert --of-- after plurality

Signed and Sealed this

Twenty-third Day of February, 1993

Attest:

STEPHEN G. KUNIN

*Attesting Officer*  *Acting Commissioner of Patents and Trademarks*